United States Patent [19]
Sirkin

[11] Patent Number: 5,978,832
[45] Date of Patent: Nov. 2, 1999

[54] TIME TO COMPLETION DETERMINATION IN A MULTITASKING WORKSTATION

[75] Inventor: Martin Jay Sirkin, Austin, Tex.

[73] Assignee: International Business Machines Corporation, Armonk, N.Y.

[21] Appl. No.: 08/322,111

[22] Filed: Oct. 12, 1994

Related U.S. Application Data

[63] Continuation of application No. 08/086,756, Jul. 1, 1993, abandoned, which is a continuation of application No. 07/705,425, May 24, 1991, abandoned.

[51] Int. Cl.⁶ .............................. G06F 17/17; G06F 9/46
[52] U.S. Cl. ........................................... 709/107; 713/502
[58] Field of Search ................................... 395/600, 550, 395/650, 557, 670, 675, 677; 709/107

[56] References Cited

U.S. PATENT DOCUMENTS

| | | | |
|---|---|---|---|
| 3,648,253 | 3/1972 | Mullery et al. | 395/650 |
| 4,344,142 | 8/1982 | Diehr, II et al. | 364/473 |
| 4,457,772 | 7/1984 | Haynes et al. | 65/160 |
| 4,495,562 | 1/1985 | Yamaji et al. | 395/550 |
| 4,827,423 | 5/1989 | Beasley et al. | 364/468 |
| 4,839,798 | 6/1989 | Eguchi et al. | 395/650 |
| 4,897,798 | 1/1990 | Cler | 364/505 |
| 4,916,682 | 4/1990 | Tomoda et al. | |
| 4,926,324 | 5/1990 | Yamamoto et al. | 395/275 |
| 4,956,784 | 9/1990 | Hadavi et al. | 364/468 |
| 5,101,340 | 3/1992 | Nonaka et al. | 395/650 |
| 5,274,545 | 12/1993 | Allen et al. | 364/148 |
| 5,301,348 | 4/1994 | Jaaskelainen | 395/800 |
| 5,361,362 | 11/1994 | Benkeser et al. | 395/725 |

OTHER PUBLICATIONS

Savitzky, *Real–Time Microprocessor Systems,* ©1985 pp. 10–11 and 176–214.
Procomm Plus for Windows User Manual, 1987, 1992 Datastorm Technologies pp. 4.42–4.45, Chambers.
Halliday et al, *Fundamentals of Physics,* 1988 pp. 12–23 John Wiley and Sons.

*Primary Examiner*—Jack M. Choules
*Attorney, Agent, or Firm*—Casimer K. Salys

[57] ABSTRACT

A method and system for estimating the time to completion of a task being executed on a multitasking workstation potentially subject to the commencement or termination of one or more other tasks. Value arises where the task subject to estimation requires upon its completion the intervention of the workstation user, such as by the physical act of switching diskettes. When the task to be completed is relatively time consuming, such as occurs with the transfer of compressed data from a diskette to a hard disk, the calculation of a complex spreadsheet, the compilation of a lengthy program, or the generation of elaborate graphics, the user of the workstation is particularly interested in knowing about when the task will be completed. With the advent of multitasking workstations and operating systems, a singular static estimation is substantially meaningless. The estimate determination must recognize and compensate for the fact that the central processing unit is a resource which is shared by multiple tasks. As tasks commence or terminate, the estimated time to completion varies for the task having the user's immediate interest. The method and system use task size, task execution rate and elapsed time to dynamically estimate the time to completion. The user is notified accordingly.

9 Claims, 2 Drawing Sheets

TIME TO COMPLETION DETERMINATION IN A MULTITASKING WORKSTATION

This is a continuation of application Ser. No. 08/086,756 filed Jul. 1, 1993, abandoned, which is a continuation of application Ser. No. 07/705,425 filed on May 24, 1991, now abandoned.

BACKGROUND OF THE INVENTION

The present invention relates generally to methods and system for determining the progress of an operation being executed on a workstation. More particularly, the invention is directed to methods and systems for estimating the time to complete a task executing on a multitasking workstation.

Efficient utilization of workstations and workstation users is an important consideration when selecting software and hardware. Efficiency of use is particularly important when the workstation hardware and operating system are the subject of a premium cost to provide a multitasking environment, namely one which has the resources to concurrently execute multiple programs. In such context it becomes vital to provide the workstation user with information regarding the progress of a program or task which requires periodic user intervention. For example, if the user must make a decision and convey that as a control input to the workstation, or the user must physically interact with the workstation such as by replacing a diskette or a tape, efficiency is affected by the timeliness of the user/operator action.

A representative example of a common problem occurs when a large application or operating system program distributed over multiple diskettes is to be loaded one diskette at a time onto a workstation. The loading of files from each diskette is a time intensive undertaking and typically varies from diskette to diskette. The conclusion of each diskette loading cycle is conventionally indicated by a single "beep" sound. The user must either wait at the workstation for the conclusion signal or have the workstation remain idle between the conclusion of a diskette load and the next visit. The non-productive user time for interaction with a single workstation is more an aggravation than a major problem, but when the wasted time is multiplied by the numerous business application workstations subject to such loading, whether performed by individual users or by a network administrator, the time wasted is significant.

One approach to giving the user some information about the status of the task is to depict by text or graphics the fact that the task is still in progress, in contrast to a single concluding beep signal. Representative examples of such prior art approaches are the clock icons and hour glass icons generated on video display screens of workstations to show the continuity of the task. More recent refinements for keeping the user aware of the progress include graphical or icon depictions of tasks shown only in proportion to the extent completed. A representative example of such is the depiction of a diskette icon shown in a fractional relation to the number of files read from the diskette.

These approaches are lacking in two respects. First, they do not provide the information in a form which allows the user the greatest flexibility. For example, the user would prefer to know the time left before a diskette load operation is completed rather than the fact that half the diskette has been loaded already. Foremost, the measures do not take into account instantaneous changes in the computational or transmission workload of the limiting workstation resource. This issue is particularly important for the new multitasking workstations where ongoing tasks can commence or conclude during the execution of the task in question, such as the aforementioned diskette load operation. If a task ends, the diskette load operation can accelerate significantly. Similarly, if one or more tasks commences during the diskette load task, the speed of the diskette load, and elapsed time to completion, can change dramatically. Thus, a dynamic estimate of the time to completion is particularly important in a multitasking, and even more so in a multitasking and multiuser, workstation environment.

Known techniques, such as those associated with calculating the time remaining in the play of an optical disk or magnetic tape based upon prior measures of track count or tape length, neither compensate for nor operate in the context of an environment using a shared signal processor. See U.S. Pat. No. 4,916,682 for representative teaching of estimating the time to completion.

SUMMARY OF THE INVENTION

The present invention is a method and system for estimating the time to completion of a task being executed on a multitasking or multiuser workstation. The goal is to provide a dynamic best estimate of the time to completion of a specified task undertaken on a multitasking workstation subject to the commencement or termination of other tasks which affect the execution time of the specified task.

The method and system of the present invention re-estimates the time to completion at successive increments of the task. The size of the task is first quantified into measurable units. Once the task is commenced, the elapsed time and units are compared to yield a rate of completion. The rate estimate is successively and incrementally adjusted to compensate for dynamic variations in the workload. The time to completion estimate is derived from the measures of rate, the incremental estimates of full task run time based upon such rate information, and measures of actual elapsed time. Nonlinear characteristics in the task execution time as well as workstation task load changes are thereby introduced to adjust the estimate.

In one practice of the invention as applied to the installation of a program composed of multiple diskettes, diskette byte and file information is provided upon the commencement of a load operation. In such a context, a timer is started before the loading of the first file from the diskette. After each file is read from the diskette, and typically written onto a hard disk of the workstation, the accumulated time and byte information is used to estimate a rate and an associated diskette load time. The estimated time to completion is the difference between the estimated time to load the diskette and the elapsed time as of the calculation. The estimation is re-calculated upon the completion of each file to adjust the estimate for workstation resource processing rate changes attributable to variations in the number of concurrently executing tasks or the number of workstation interactive users.

The method and system of the present invention is not limited to diskette loading operations, but is fully applicable to other workstation tasks which are relatively quantifiable in increments, may or may not expect user interaction, and are by virtue of the complexity or volume likely to extend over significant time during execution.

These and other features of the invention will be more clearly understood and appreciated upon considering the detailed embodiment set forth hereinafter.

DESCRIPTION OF THE PREFERRED EMBODIMENT

Figure 1:
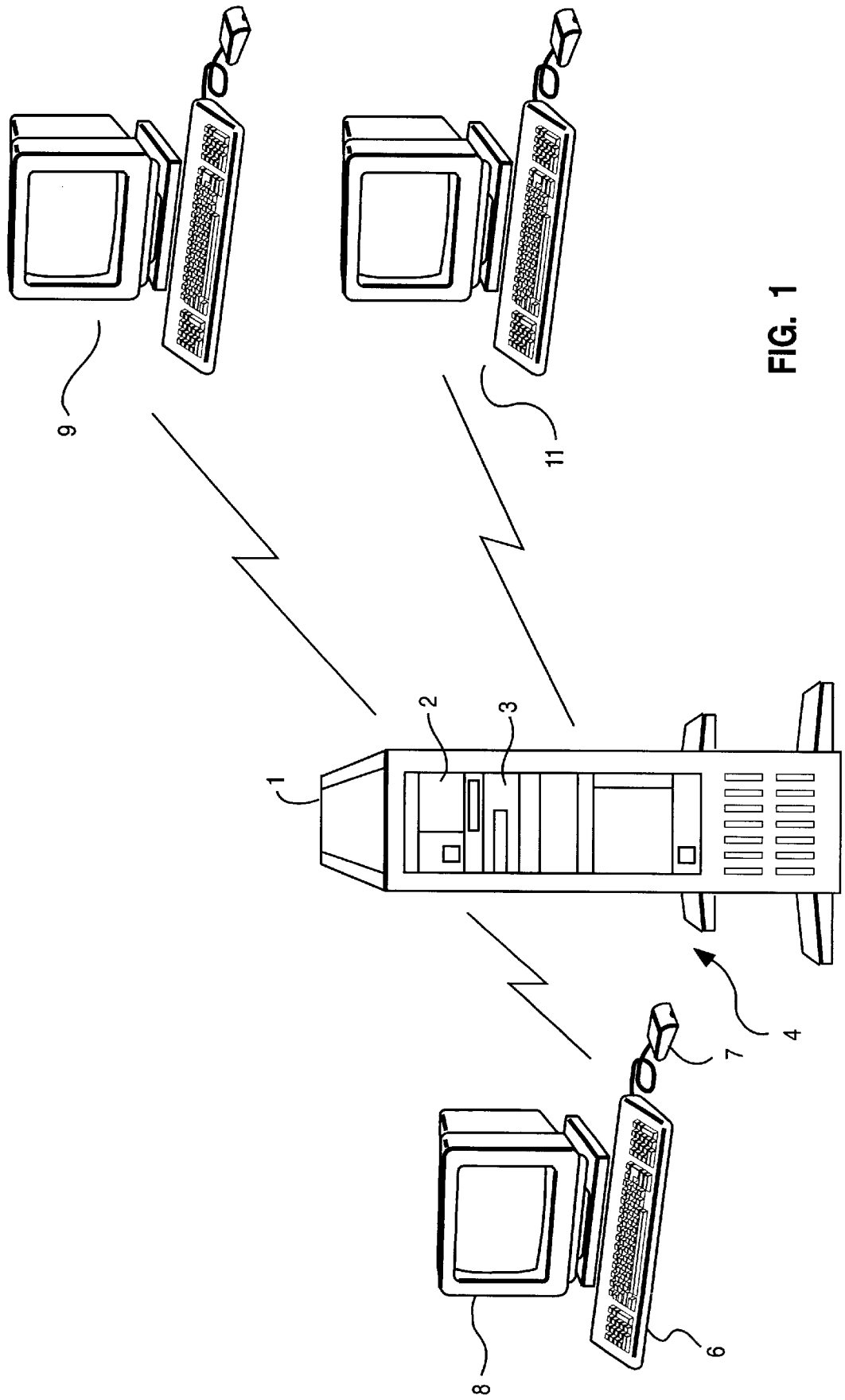
FIG. 1 schematically illustrates a multitasking and multiuser workstation system.

FIG. 1 schematically illustrates a representative system by which the present invention can be practiced. Within the depiction there is shown a workstation 1 having a hard disk drive 2 and a floppy disk drive 3, together with the related workstation processor, memory and communication electronics, generally at 4, which control and interact with the workstation keyboard 6, mouse 7 and video display 8. A representative workstation is the Model PS/2 manufactured and distributed by International Business Machines Corporation. Representative operating system software to control the workstation and to provide the multitasking capability is the OS/2 program product available from International Business Machines Corporation. For purposes of further illustration, FIG. 1 also includes physically independent terminals 9 and 11, which terminals are configured in networks and communicate with workstation 1 using defined protocols such as ethernet or token ring. They are merely present to illustrate that the processor in workstation 1 is subject to workload effects introduced not only by the local user multitasking operations but also by the independent communicative actions of remote users.

The status and estimated time to completion of a task invoked for execution by the central processing unit resource of workstation 1, such as the calculation of a spreadsheet, the compilation of a program or the printing of graphics or text, is affected by any time intensive shared usage. Consequently, the time to completion estimate for an operation limited by this resource is not merely based upon the speed of the processor and the size of the task, but is a dynamic value which varies depending upon the workload of the central processing unit.

The limiting factor in the completion of a task may not be the central processing unit, but rather another resource subject to shared use or having a relatively slow response. Representative resources are the controllers and drives of disk systems, communication cards or printers. For example, if the specified task entails a transfer of data from a diskette to a hard disk, and the task is performed in concurrence with a second and independent task of moving data hard disk files from one sub-directory to another sub-directory, the time to completion of the specified task is constrained by the shared disk controller and disk head resources.

The installation of a large application program into a workstation is a good context within which to explain the invention. In such case, the user/operator/system administrator commences to load by individual diskette a program which is distributed over multiple diskettes. Each diskette is composed of multiple files. The user interacts with workstation 1 through keyboard 6 and mouse 7, while receiving information back from the workstation through video display 8 or an audio system conveying tones or synthesized voices. The diskettes are individually inserted into drive 3 for reading and, upon decompression by the central processing unit, are written on to hard disk drive 2 for subsequent loading into the volatile memory of the workstation. As suggested earlier, the user's dilemma arises from the extended time which elapses with the loading of each diskette, and the potential termination or intervention of other tasks or users on workstation 1 so as to affect the duration of the load time. If the user wishes to minimize the loading time of the multiple diskettes, each successive diskette must be inserted relatively soon after the completed loading of the preceding diskette.

According to one practice of the invention, the estimation of time to completion is accomplished by adding to each diskette of the installation package a data file including the number of bytes to be copied from that diskette, the names of the successive files, the directories to which the files are to be copied, and the byte size of each file on the diskette. Using such information, the present method and system for estimating completion begins a timer with the onset of copying the first file from the diskette to the hard disk. After the file has been copied, the method determines the transfer rate using the number of bytes of the file and the elapsed time. This is repeated upon the conclusion of each successive file transferred. Estimated time to completion is measured by determining the rate of transfer, determining the time for loading the complete diskette at such transfer rate, and then subtracting the time elapsed from the complete diskette determination. Empirical evidence has established that as the number of iterations increases the accuracy of the estimate improves.

Consider the simple example where a selected one of multiple diskettes to be copied contains 100,000 bytes. Following the copying of the first file, which is defined to be composed of 5,000 bytes and accomplished in 2 seconds, the time for loading the full diskette can be estimated to be 40 seconds. At that point, workstation 1 generates on video display 8 an estimated time to completion of 38 seconds (40–2). If the copying of the second file, defined to be composed of 55,000 bytes, is complete after an elapsed time of 16 seconds, an updated estimate of the diskette load time based upon such new rate information is in the range of 27 seconds. Consequently, the estimated time to completion is determined and shown as 11 seconds (27–16). As diskette loading continues, the method and system further adjusts the estimated time to completion based upon an averaging of the fluctuating rate of file transfer. Therefore, each successive estimate is refined to compensate for processor rate fluctuations irrespective of whether such fluctuations are attributable to the file content, changes in the workstation tasks, or changes in the workstation user count.

Figure 2:
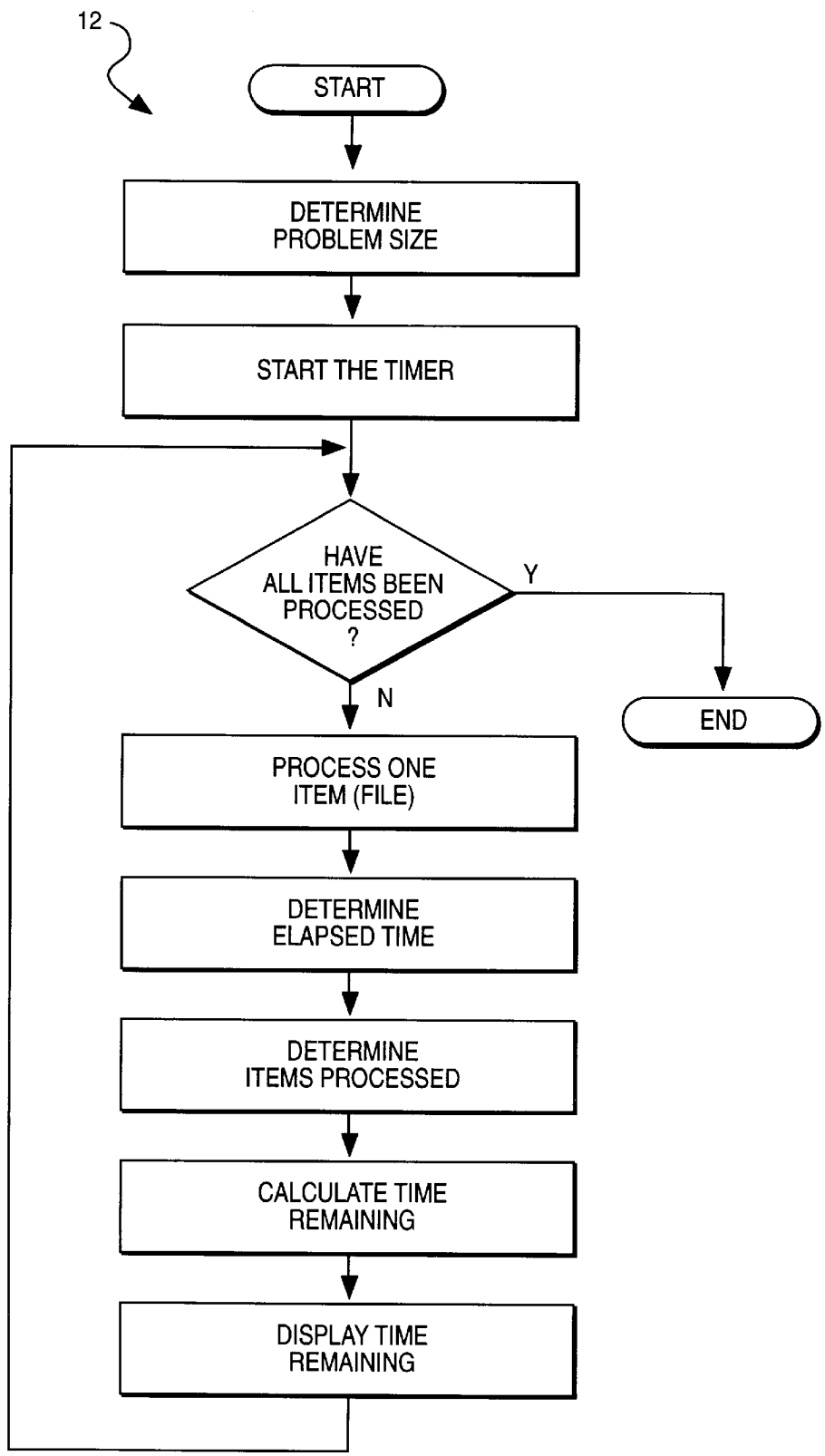
FIG. 2 schematically illustrates by flow diagram a method of practicing the invention.

FIG. 2 depicts by flow diagram the elements and interactions which form the method of the present invention. The steps generally include a start step 12, a determination of the problem size step 13, a start of timer step 14, a decision step 16 (whether all the items have been processed), an end step 17 (if all have been processed), a process one item step 18, a determination of elapsed time step 19, a determination of items processed step 21, a calculation of the time remaining step 22, and a display of the time remaining step 23, returning to the input of the decision step 16. Set forth below is pseudo code, from which source code can be derived, suitable to define the important features of the invention as might be practiced in a computer program.

Determine size of problem to be solved in some arbitrary units (bytes for file copying).
Start a timer.
Iterate through the input source.
    Process one entity (file for file copying).
    Determine how much time has elapsed since the timer started.
    Determine how much of the input source has been processed.
    Calculate the time remaining according to the formula:

$$Tr=(S*T/P)-T$$

Where:
    Tr=Estimated time remaining.
    S=Problem size.
    T=Time elapsed so far.
    P=Processed input source.
Display estimated time to completion.

Though the invention has been described in detail with reference to the loading of a program which is stored in a compressed form on a multiplicity of disks and transferred onto a workstation hard disk in a configuration suitable for workstation use, the fundamental concepts of the invention extend to and encompass a broader range of applications. Thus, the concept of a dynamically varying time to completion is applicable and valuable with any workstation process subject to change as a consequence of loading variation on the limiting resource, commonly the central processing unit. The value to a user increases as the duration of the task in question lengthens and the likelihood of intervening central processor loading effects increase.

Another such example to which the invention pertains is in the context of the spreadsheet calculation. The time to completion can be quite significant, yet the row or cell count allows for reasonable quantification. Thus, spreadsheet calculation lends itself to the estimation of time to completion. A third example involves the compiling of a program, where the measure of quantity may be related to the lines of the program or the size of the file. In such context the estimation method and system may have to take into account the multiple passes which are common to some compilers. A fourth example having particular relevance involves time intensive printer format conversion of text or graphics, to the extent that file size, row count or graphic primitive information can provide reasonable measures for task quantification. These are but a few examples of applications in which the method and system of the present invention is particularly useful and valuable.

Though the invention has been described and illustrated by way of specific embodiments, the underlying method and system should be understood to extend to all variants defined by the claims set forth hereinafter.

I claim:

1. Method for estimating and displaying a time to completion of a task executing on a multitasking workstation, comprising the steps of:

operating the workstation in a multitasking mode;

driving a display by the workstation;

generating through a first calculation in the workstation a first estimate of time to completion of a specified task based upon a size and a rate of execution of the specified task over an increment of time;

generating through a plurality of successive calculations revised estimates of time to completion based upon successively later incremental measurements of the rate of execution, where the revised estimates of time are responsive to the effects of changes in the composite multitask load of the multitasking workstation; and driving the display to notify a user of the multitasking workstation of the revised estimates after their generation.

2. The method recited in claim 1, wherein the steps of generating estimates of time comprise:

determining what part of the specified task is completed at a conclusion of a time interval; and determining a time elapsed from a commencement of the task.

3. The method recited in claim 1, wherein the steps of generating estimates of time comprise:

determining what part of the specified task is completed during a time interval; and determining a duration of the time interval.

4. The method recited in claim 2 wherein the specified task comprises a transfer of data from nonvolatile storage.

5. The method recited in claim 3, wherein the specified task comprises a transfer of data from nonvolatile storage.

6. A system that electronically controls the operation of a multitasking workstation to estimate and display the time to completion of tasks executing on the workstation, comprising:

a multitasking workstation;

a display connected to and controlled by the workstation;

means for measuring a size of a specified task to be executed on the workstation;

means for measuring a rate of execution of the specified task over an incremental interval of time;

means for estimating and displaying a time to completion of the specified task based on the size and the rate of execution of the specified task over an increment of time;

means for reestimating the time to completion based upon successively later incremental measurements of the rate of execution, where the reestimated times to completion are responsive to the effects of changes in the composite multitask load of the multitasking workstation; and means for visually generating on the display revised estimates of time to completion.

7. The system recited in claim 6, wherein the means for measuring a rate of execution of the specified task is comprised of:

means for determining what part of the specified task has been completed at a conclusion of a time interval; and means for determining elapsed time from a commencement of the task.

8. The system recited in claim 6, wherein the means for measuring a rate of execution of the specified task comprises:

means for determining what part of the specified task has been completed during a time interval; and means for determining a duration for the time interval.

9. A multitasking workstation with resources to estimate and display a time to completion of one or more tasks executing thereon, comprising:

a video display means;

a multitasking processor controlling the video display means;

executable program code for controlling the operation of the multitasking processor to measure a size of a specified data processing task executing on the workstation;

executable program code for controlling the operation of the multitasking processor to measure a rate of execution of the specified data processing task over an increment of time;

executable program code for controlling the operation of the multitasking processor to estimate a time to completion of the specified data processing task over an increment of time;

means for displaying the time to completion estimate on the video display means; and executable program code for repeating the estimate to obtain a revised estimate of time to completion based upon successively later incremental measurements of the rate of execution, where the revised estimate of time is responsive to the effects of changes in composite multitask load of the multitasking workstation, and enabling the display of the revised estimate.

* * * * *